United States Patent [19]
Sanchez

[11] Patent Number: 5,529,052
[45] Date of Patent: Jun. 25, 1996

[54] BAKING OVEN

[76] Inventor: Francisca S. Sanchez, c/ Baldomero Sola, 156 Badalona, Barcelona, Spain

[21] Appl. No.: 345,311

[22] Filed: Nov. 28, 1994

[30] Foreign Application Priority Data

Nov. 26, 1993 [ES] Spain ................................. 9302499

[51] Int. Cl.⁶ .................................................. F24C 15/32
[52] U.S. Cl. ..................... 126/21 A; 126/246; 126/261; 34/196; 34/222; 34/229
[58] Field of Search ...................... 126/21 A, 246, 126/261, 265; 34/666, 195, 196, 215, 222, 229

[56] References Cited

U.S. PATENT DOCUMENTS 3,375,592  4/1968  Heinicke et al. ........................ 34/666
3,411,493  11/1968  Everson et al. ........................ 126/21 A
4,242,807  1/1981  Brauh ........................................ 34/222

FOREIGN PATENT DOCUMENTS 347768  8/1960  Switzerland ............................. 34/222
521441  7/1976  U.S.S.R. .................................. 34/196

Primary Examiner—Carroll B. Dority
Attorney, Agent, or Firm—Michael J. Striker

[57] ABSTRACT

A baking oven comprises means forming an oven heating chamber, a heating means, a turbine that propels hot air toward the heating chamber, at least one hollow bridge located in the heating chamber and provided with hot air outlets, guides which guide the hollow bridge so as to shift the hollow bridge, and a bridge shifting unit arranged so as to force the bridge to make shifting movements on the guides.

10 Claims, 2 Drawing Sheets

BAKING OVEN

BACKGROUND OF THE INVENTION

The present invention relates generally to an oven, and in particular to an oven, of the type employed to bake products, preferably food products and which incorporates heating means, and some turbines that propel hot air towards the oven interior.

The ovens that are known at present time incorporate a turbine that propels the heated air through some heating means and projects it towards the interior area of the oven through a plurality of openings or grooves made in the walls thereof, in such a way that permits the heating of such interior area of the oven where a trayholder carriage is placed which serves as support of the product to be baked.

With the object of obtaining a uniform distribution of the heat in the interior of the heating chamber, this type of oven has a large number of openings for the hot air outlet, in the lateral side of its limit, since on the contrary the heat will project itself in some definite points of the product, and for this reason the baking will not be uniform; furthermore this large number of outlets are placed both in the rotative ovens, in which the carriage rotates over a central shaft, as well as in static ovens in which the trayholder carriage does not move during the baking process of the product.

The problem that this type of ovens offers is the large number of outlets placed in the lateral sides of the heating chamber, which make difficult its manufacturing and which consequently make it more expensive; on the other hand their capacity is limited since in its interior only one trayholder carriage can be placed.

SUMMARY OF THE INVENTION

Accordingly, it is an object of the present invention to provide a baking oven which avoids the disadvantages of the prior art.

In keeping with these objects and with others which will become apparent hereinafter, one feature of the present invention resides, briefly stated, in a baking oven which presents the peculiar characteristic of having a hollow bridge in the interior of the heating chamber, with a reduced number of openings vertically distributed in the interior lateral thereof, this hollow bridge is mounted on some parallel guides on which it can be longitudinally shifted to describe alternative movements with a run of equal length to the existing one between two consecutive hot air outlet openings.

This hollow bridge internally defines some dimensions that allow the location in its interior of at least one trayholder carriage with the product to be baked.

The hollow bridge has a hot air inlet opening on which an interior duct in coupled through which circulates a hot fluid collected from the heating means and propelled by a turbine; the coupling between the hollow bridge and the hot fluid circulation duct is sliding, in such a way that the bridge can be displaced describing the shifting movements already mentioned, maintaining the coupling with the hot air circulation fixed duct.

It has been foreseen that the shifting displacements of the bridge on the guides should be carried out by means of a movement transmission mechanism driven by a motor element, which allows that when the bridge describes such shifting movements, the outlets will be able to displace themselves from their original position until they reach the position previously occupied by the consecutive outlet in the forward heading direction making successive sweepings with the hot fluid on the product, reaching a uniform baking thereof with a reduced number of outlets.

Furthermore this oven has the advantage that the total length may be as high as you wish, incorporating in the interior of the heating chamber different hollow bridges, with their corresponding means of heating, turbines and movement transmitting mechanisms, all the bridges moving simultaneously to form a baking tunnel in which interior different trayholder carriages with the product to be baked are aligned.

In the case that a baking tunnel is formed, it has been foreseen that in the interior of the heating chamber some carriages dragging means are available to facilitate the introduction and extraction thereof.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

DESCRIPTION OF THE PREFERRED EMBODIMENTS

Figure 1:
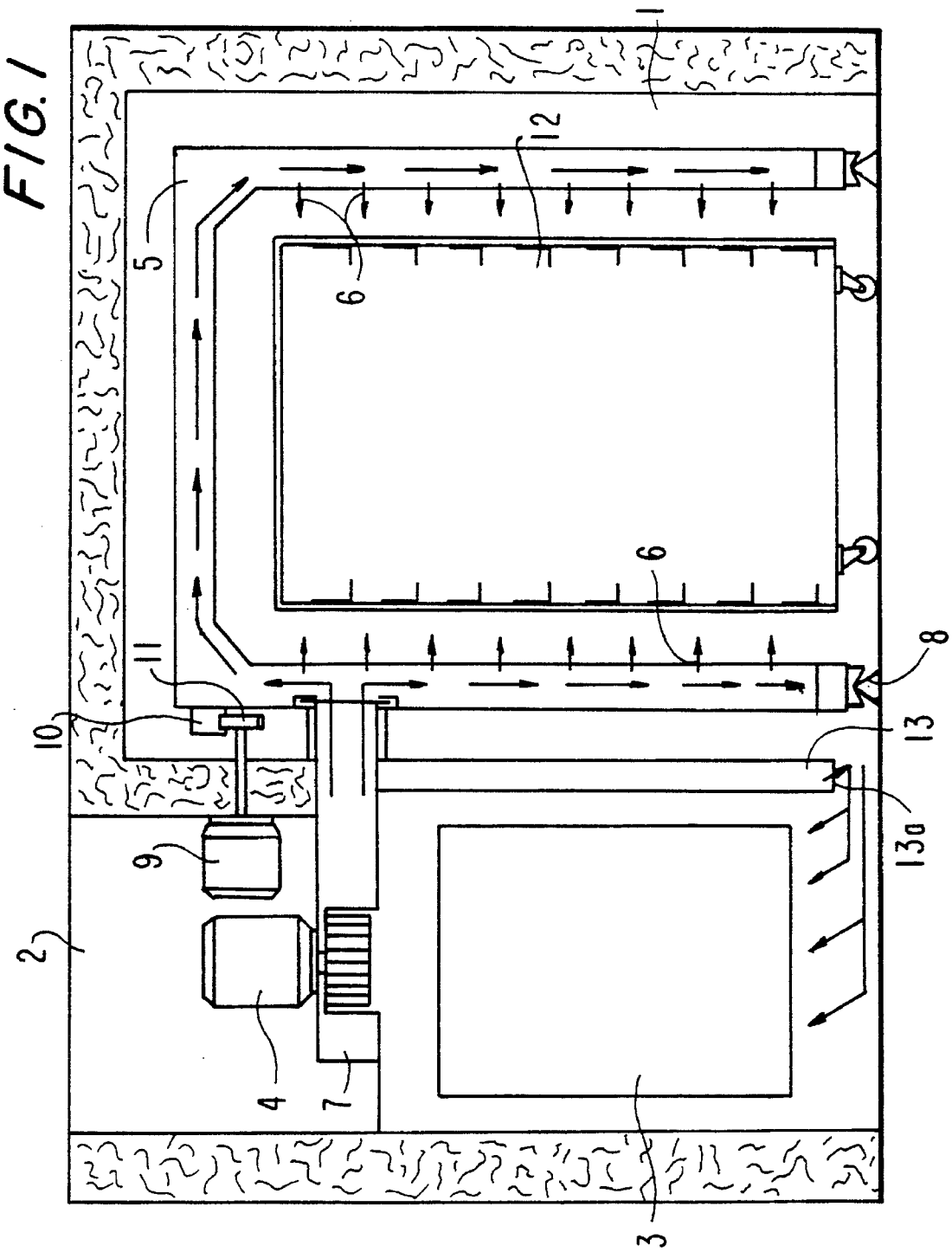
FIG. 1 shows an elevational view, sectioned by a vertical plane, of the improved oven, object of this invention, with only one bridge.

As it is noted in the above mentioned figures, the oven of the invention incorporates a heating chamber (1), in which the baking of the product is performed, producing the heating thereof by the introduction of hot air; moreover this oven incorporates an annexe compartment (2) in which the heating means (3) are located, and a turbine (4) in charge of propelling the hot air towards the interior of the chamber (1).

In the interior of such chamber (1) it is available at least one hollow bridge (5) which defines in its confronted interior laterals different vertical outlets (6) equidistant, through which the hot fluid emerges propelled by the turbine (4).

The turbine (4) and the bridge (5) are in relation with each other by means of a fixed duct (7) that introduces itself in the interior of the heating chamber (1) and such end is coupled with shifting possibility on the exterior wall of the bridge (5);. To carry out this coupling it is provided that the duct (7) tops out by the mouth which is introduced in the interior of the bridge (5) in a plane peripheral frame, and that the bridge wall (5) defines an opening of greater dimension than the section of the duct (7) and smaller than the defined surface by such peripheral frame arranged in the duct (7);. In this way the bridge (5) will maintain itself connected with the duct (7) independently of the running position that occupies, allowing the entry of hot fluid propelled by the turbine.

The bridge (5) is supported with shifting possibility on some lower guides (8) with the possibility that can make shifting movements which run coincides with the distance that separates two consecutive outlets (6).

For displacing the bridge (5) on the guides (8) the driving is produced by a motor element (9) through a transmission mechanism of movement, It is formed by a zip fastener (10) linked to the bridge (5), and on which is acting a driven pinion (11) controlled by a motor element (9).

The bridge (5) defines some appropriate dimensions to permit the location in its interior of at least a trayholder carriage (12) designed to support the product that is going to be baked in the interior of the heating chamber (1).

In the areas near the heating means (3), the heating chamber (1) and the annexe compartment (2) are separated by a humidifier chamber (13), having an outlet at 13a for discharging vapor into the air to be heated. An opening (14) under it allows the passage of the hot fluid from the heating chamber (1) to the annexe compartment (2), in such a way that the hot fluid contained in the heating chamber (1) is sucked out by the turbine (4), passing through the opening (14) and the heating means (3), in order to be newly propelled through the duct interior (7) towards the bridge (5) emerging through the opening (6) defined in the bridge (5). In this way a continuous circulation of the fluid is originated producing the oven high performance.

It has been foreseen that the heating chamber (1) presents two confronted inlets (15) and (16) that can be opened to the exterior, closed through some fixed transparent plates (17) or lowerable ones (18).

Figure 2:
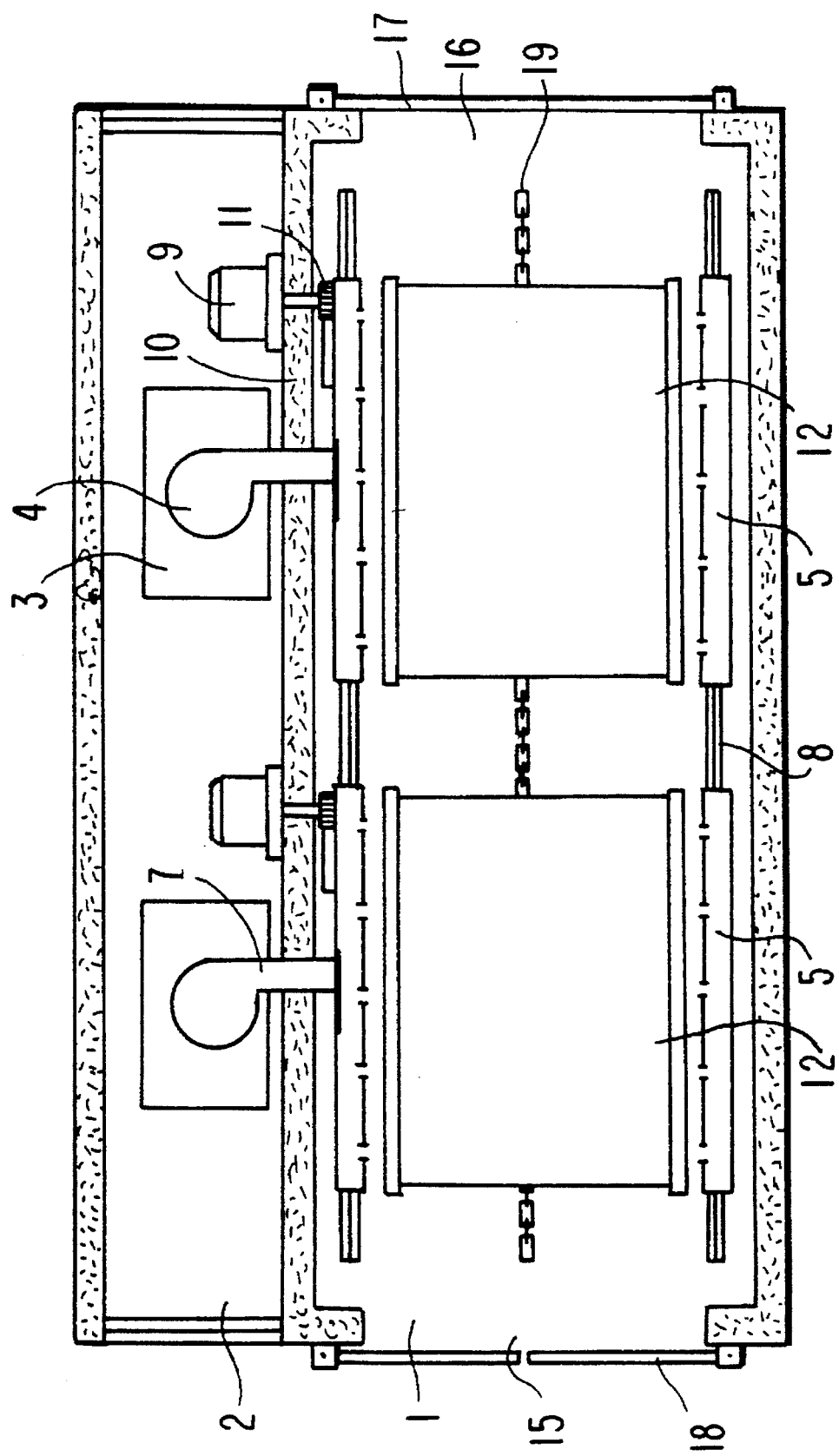
FIG. 2 shows a plant view, sectioned by a horizontal plane, of the oven with two bridges aligned to form a baking tunnel.

Given the design of the elements which form the oven and the fact that the bridges (5) are shiftable to allow the hot air to emerge through the outlets (6), making swifts on the product covering the total surface of the product, this oven allows that the heating chamber (1) defines such large length as desired, being able to incorporate various aligned bridges, as it is represented in FIG. 2, in order to make the simultaneous baking of the product contained in different trayholder carriages (12) since once they are introduced in the interior of the oven they remain static, being the hollow bridges simultaneously shifted (5).

With the object of carrying out the introduction and extraction of the trayholder carriages (12) in the interior of the baking tunnel the oven incorporates some dragging means preferably formed by a chain (19) with some means of fastening to the carriage.

In the case of forming a baking tunnel each of the bridges (5) will incorporate the corresponding baking means (3), turbines (4) and shifting means.

Once the nature of the invention is sufficiently described, as well as the practical embodiment thereof, it is stated that some changes can be introduced considering that they are appropriate, whenever the essential characteristics that are claimed below do not change.

It will be understood that each of the elements described above, or two or more together, may also find a useful application in other types of constructions differing from the types described above.

While the invention has been illustrated and described as embodied in a baking oven, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims.

I claim:

1. A baking oven, comprising means forming an oven heating chamber; an air heating means; a turbine that propels hot air from said air heating means toward said heating chamber; at least one hollow bridge located in said heating chamber and provided with hot air outlets; guides which guide said hollow bridge so that said hollow bridge may be shifted; bridge shifting means arranged so as to force said bridge to make shifting movements on said guides, said bridge has a hot air inlet formed by an opening; a hot air circulation duct having an end introduced in said opening; and means for coupling said duct with said bridge so as to allow a relative shifting between said duct and said bridge.

2. A baking oven, comprising means forming an oven heating chamber; an air heating means; a turbine that propels hot air from said air heating means toward said heating chamber; at least one hollow bridge located in said heating chamber and provided with hollow air outlets; guides which guide said hollow bridge so that said hollow bridge may be shifted; bridge shifting means arranged so as to force said bridge to make shifting movements on said guides; a transparent plate mounted fixedly on one inlet of said bridge, and a means forming lowerable transparent plate mounted on another inlet of said heating chamber; and means for lowering said lowerable transparent plate.

3. A baking oven, comprising means forming an oven heating chamber; an air heating means; a turbine that propels hot air from said air heating means toward said heating chamber; at least one hollow bridge located in said heating chamber and provided with hot air outlets; guides which guide said hollow bridge so that said hollow bridge may be shifted; bridge shifting means arranged so as to force said bridge to make shifting movements on said guides; and a lateral wall adjacent to said heating means and having a portion which is formed by a humidifying chamber with vapor outlets oriented toward said heating chamber to humidify hot air.

4. A baking oven as defined in claim 1, wherein said bridge has exterior dimensions which are somewhat smaller than the exterior dimensions of said heating chamber.

5. A baking oven as defined in claim 1, wherein said bridge is formed so that it has dimensions allowing a positioning in its interior of at least a trayholder carriage.

6. A baking oven as defined in claim 1, wherein said bridge shifting means include a zip fastener, a pinion coupled to said zip fastener, and a motor element driving said pinion.

7. A baking oven as defined in claim 1; and further comprising trayholder carriage dragging means in an interior of said bridge.

8. A baking oven as defined in claim 3, wherein said heating chamber is provided with a hot air outlet opening under said humidifying chamber so that not air is sucked up by said turbine through said hot air outlet opening toward said heating means in order to propel the hot air again toward said bridge.

9. A baking oven as defined in claim 1, wherein said hot air outlets are equidistant and parallel.

10. A baking oven as defined in claim 1, wherein said hot air outlets are vertically spaced outlets.

* * * * *